US012096143B2

(12) United States Patent
Kostrzewa

(10) Patent No.: US 12,096,143 B2
(45) Date of Patent: Sep. 17, 2024

(54) BURN-IN MITIGATION AND ASSOCIATED IMAGING SYSTEMS AND METHODS

(71) Applicant: Teledyne FLIR Commercial Systems, Inc., Goleta, CA (US)

(72) Inventor: Joseph Kostrzewa, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 14 days.

(21) Appl. No.: 17/981,258

(22) Filed: Nov. 4, 2022

(65) Prior Publication Data

US 2023/0058486 A1 Feb. 23, 2023

Related U.S. Application Data

(63) Continuation of application No. PCT/US2021/031198, filed on May 6, 2021.

(60) Provisional application No. 63/022,241, filed on May 8, 2020.

(51) Int. Cl.
*H04N 25/626* (2023.01)
*H04N 5/33* (2023.01)
*H04N 25/683* (2023.01)

(52) U.S. Cl.
CPC ............. *H04N 25/626* (2023.01); *H04N 5/33* (2013.01); *H04N 25/683* (2023.01)

(58) Field of Classification Search
CPC ...... H04N 25/626; H04N 5/33; H04N 25/683; G01J 5/20; G01J 5/24
See application file for complete search history.

(56) References Cited

U.S. PATENT DOCUMENTS 5,233,161 A * 8/1993 Farwell .................. G01R 31/30 219/209
6,028,309 A * 2/2000 Parrish ...................... G01J 5/20 250/252.1
8,080,794 B1 * 12/2011 Woolaway ............... H04N 5/33 250/338.1
9,102,776 B1 8/2015 Kostrzewa et al.
2004/0119855 A1 * 6/2004 Partain ................... H04N 25/63 348/222.1
2005/0192773 A1 * 9/2005 Sheng ...................... G01K 7/42 374/E7.042
2015/0146014 A1 * 5/2015 Black ........................ G06T 5/94 348/222.1
2015/0358558 A1 * 12/2015 McKenzie ........ H01L 21/76251 83/365
2017/0115395 A1 * 4/2017 Grauer .................... G01S 17/89
2018/0352174 A1 12/2018 Oleg et al.
2019/0368941 A1 * 12/2019 Aziz .................... H04N 25/677
2022/0377263 A1 * 11/2022 Hayashi .................... G01J 1/42

* cited by examiner

*Primary Examiner* — Michael Lee
(74) *Attorney, Agent, or Firm* — Haynes and Boone, LLP

(57) ABSTRACT

Techniques for facilitating burn-in mitigation and associated imaging systems and methods are provided. In one example, a method applying a bias signal to a sensor array of an imaging device to increase a temperature of the sensor array to perform burn-in mitigation. The method further includes reducing the temperature of the sensor array. The method further includes determining whether a burn-in is present in the sensor array. Related systems and devices are also provided.

20 Claims, 7 Drawing Sheets

BURN-IN MITIGATION AND ASSOCIATED IMAGING SYSTEMS AND METHODS

CROSS-REFERENCE TO RELATED APPLICATIONS

This application is a continuation of International Patent Application No. PCT/US2021/031198 filed May 6, 2021 and entitled "BURN-IN MITIGATION AND ASSOCIATED IMAGING SYSTEMS AND METHODS," which claims priority to and the benefit of U.S. Provisional Patent Application No. 63/022,241 filed May 8, 2020 and entitled "BURN-IN MITIGATION AND ASSOCIATED IMAGING SYSTEMS AND METHODS," all of which are hereby incorporated by reference in their entirety.

TECHNICAL FIELD

One or more embodiments relate generally to imaging and more particularly, for example, to burn-in mitigation and associated imaging systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes applying a bias signal to a sensor array of an imaging device to facilitate burn-in mitigation. The method further includes reducing the temperature of the sensor array. The method further includes, after the reducing the temperature, determining whether a burn-in is present in the sensor array. In some aspects, the applying may be based on determining that a burn-in is present in at least a portion of the sensor array and/or a user instruction/input.

In one or more embodiments, an imaging device includes a sensor array configured to capture images of a scene. The imaging device further includes a processing circuit configured to apply a bias signal to the sensor array to increase a temperature of the sensor array to for burn-in mitigation. The processing circuit is further configured to reduce the temperature of the sensor array. The processing circuit is further configured to, after reducing the temperature, determine whether a burn-in is present in the sensor array. In some aspects, the processing circuit is configured to apply the bias signal determining that a burn-in is present in at least a portion of the sensor array and/or a user instruction/input.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
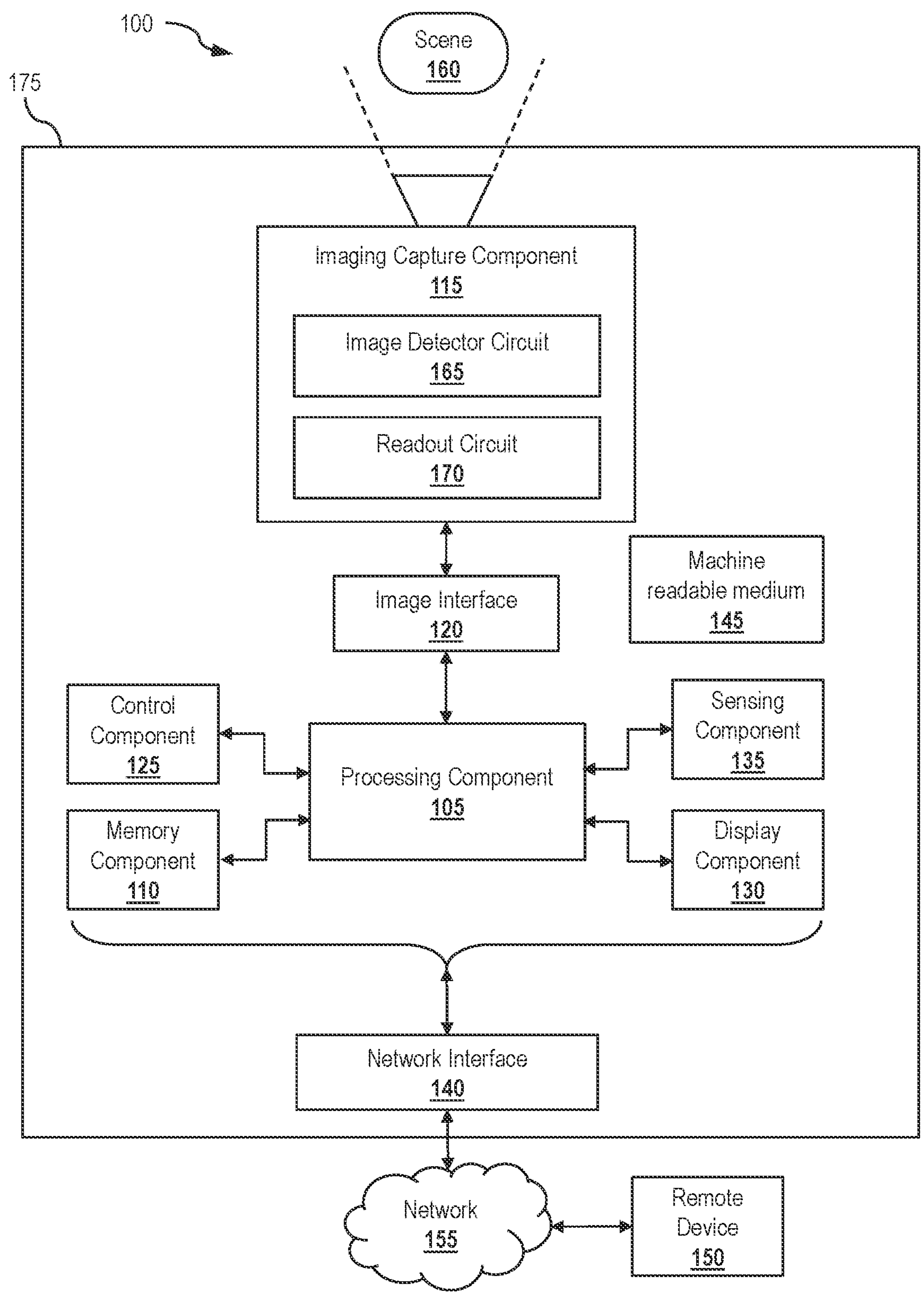
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate burn-in mitigation and associated imaging systems and methods. In some embodiments, a burn-in effect (e.g., also referred to as a sunburn effect, burn-in, or sunburn) is mitigated for an imaging device. The imaging device includes a focal plane array and a bias generator. In some aspects, the imaging device may include a burn-in detector. The imaging device may include an image detector circuit and a readout circuit. The image detector circuit may include a detector array formed of detector pixels (e.g., also referred to as detector elements or simply pixels). Each detector pixel detects image data associated with components of incident EM radiation and generates signals (e.g., electrical signals) indicative of the detected image data. The signals may include photocurrent generated by the detector element in response to incident EM radiation. The burn-in detector may determine whether a burn-in is present in at least a portion of the focal plane array (e.g., at least a subset of the pixels of the detector array). The bias generator may apply a bias signal on the detector array according to whether a burn-in is determined to be present. When the burn-in is determined to be present or upon demand (e.g., user demand, user input, user instruction), the bias generator may apply a bias signal on the detector array appropriate to heat the detector array to increase a decay rate of the burn-in. In an embodiment, the detector array may include microbolometers.

In an embodiment, when the detector array (e.g., microbolometer array) of the imaging device images the Sun and/or other high-irradiance source, a burn-in effect may take place in which an exposed portion of the array (e.g., exposed pixels of the detector array) have an offset due to imaging the Sun and/or other high-irradiance source. In an aspect, the offset corresponds to, and may be referred to as, a burn-in or a sunburn. For example, a portion of the detector array of the imaging device may be exposed to the Sun and/or other high irradiance source. The portion of the detector array may have an offset due to the portion's exposure to the Sun and/or other high irradiance source. Image pixels captured by the portion of the detector array may appear as bright spot(s) and/or a streak(s) (e.g., such as if the detector array is moved while imaging the high irradiance source), thus adversely affecting image quality. It is noted that the detector array need not be active in capturing (e.g., turned on to capture) an image to exhibit a burn-in effect. The portion of the detector array that exhibits a burn-in effect may have been exposed to the Sun and/or other high irradiance source when the imaging device was off (e.g., the Sun and/or other high irradiance source fell within an field of view of the detector array when the imaging device was off).

Various embodiments of methods and systems disclosed herein may be included in or implemented as various devices and systems such as visible-light imaging systems, infrared imaging systems, imaging systems having visible-light and infrared imaging capability, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent the housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the image capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., an ROIC). In some cases, the image capture component 115 does not have a shutter, such that the image detector circuit 165 is exposed to a scene encompassed by a field of view of the image capture component 115. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MWIR) radiation (e.g., EM radiation with wavelength of 2 μm to 5 μm), and/or long-wave IR (LWIR) radiation (e.g., EM radiation with wavelength of 7 μm to 14 μm), or any desired IR wavelengths (e.g., generally in the 0.7 μm to 14 μm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. The array of detectors may be arranged in rows and columns.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may comprise an IR imaging sensor having an FPA of detectors responsive to IR radiation including near infrared (NIR), SWIR, MWIR, LWIR, and/or very-long wave IR (VLWIR) radiation. In some embodiments, the image capture component 115 may also include a complementary metal oxide semiconductor (CMOS) sensor or a charge-coupled device (CCD) sensor that can be found in any consumer camera (e.g., visible light camera). Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
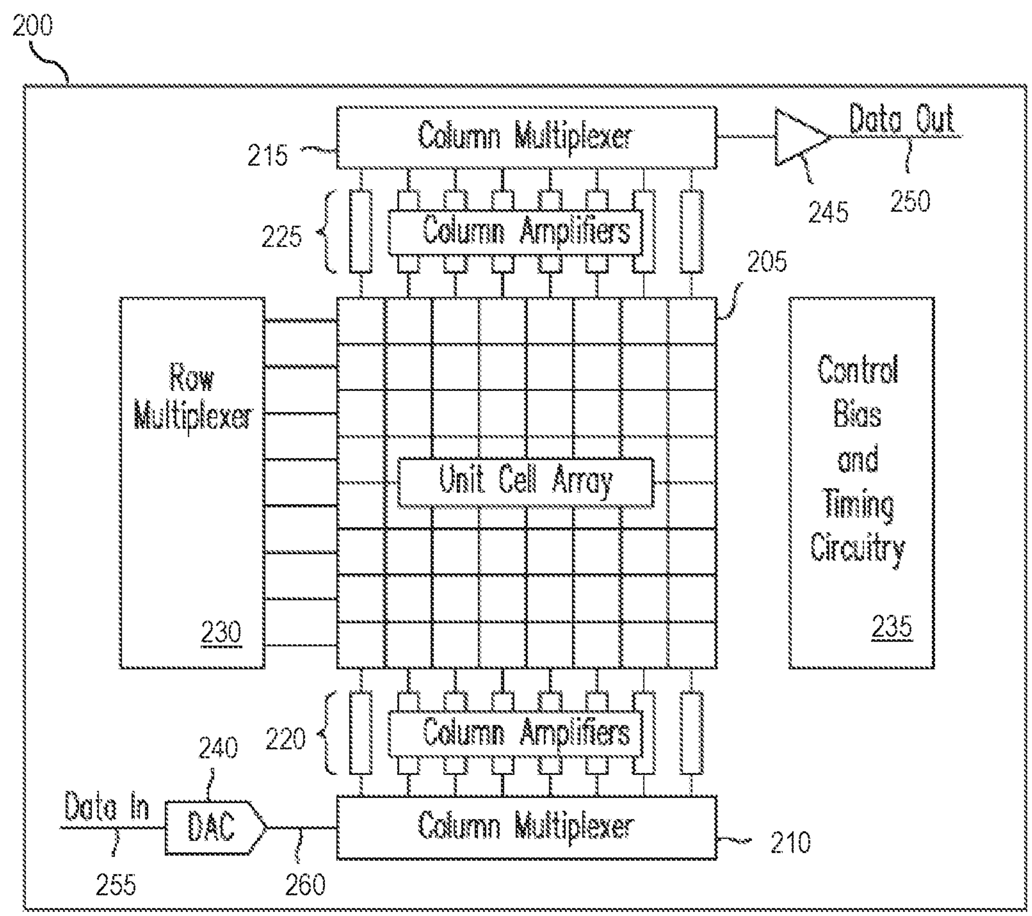
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the imaging capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an embodiment, components of the image sensor assembly 200 may be implemented such that the unit cell array 205 is hybridized to (e.g., bonded to, joined to, mated to) the ROIC.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. In some cases, the bias signal may be applied to one or more contacts (e.g., leads) associated with the unit cells. By providing appropriate bias signals to each unit cell, the unit cell array 205 may be effectively calibrated to provide accurate image data in response to light (e.g., IR light) incident on the detectors of the unit cells. In an aspect, the control bias and timing circuitry 235 may be, may include, or may be a part of, a logic circuit or processing circuit. In an embodiment, the bias signal may be adjusted appropriately to facilitate burn-in mitigation.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or imaging capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
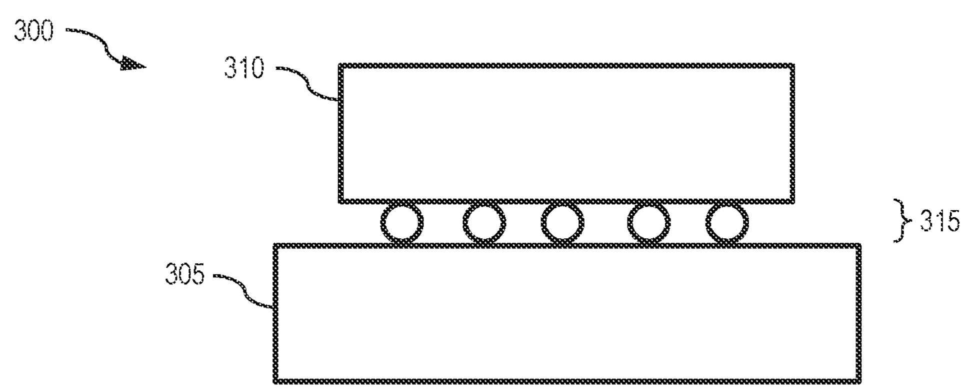
FIG. 3 illustrates an example image sensor assembly in accordance with one or more embodiments of the present disclosure.

In an embodiment, components of the image sensor assembly 200 may be implemented such that a detector array is hybridized to (e.g., bonded to) a readout circuit. For example, FIG. 3 illustrates an example image sensor assembly 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 300 may be, may include, or may be a part of the image sensor assembly 200.

The image sensor assembly 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 205). The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

Figure 4:
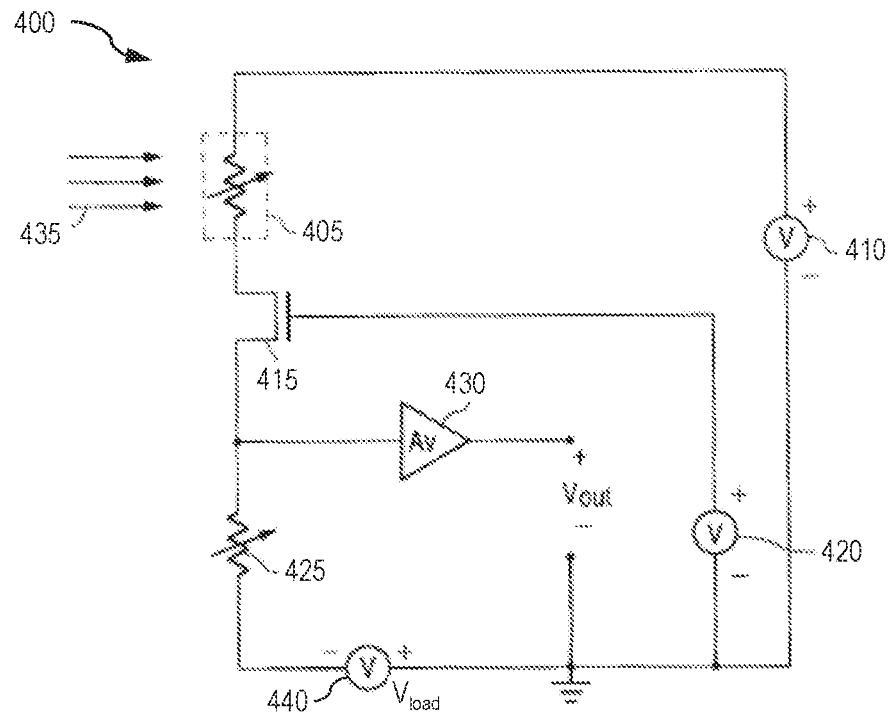
FIG. 4 illustrates a circuit that includes a common gate amplifier with a substrate temperature compensated load.

FIG. 4 illustrates a circuit 400 that includes a common gate amplifier 415 with a substrate temperature compensated load. The circuit 400 provides substrate temperature compensation for a load impedance. A microbolometer 405 (e.g., thermally-isolated microbolometer) is biased by a bias generator 410 and a source potential of the common gate amplifier 415. A bias generator 420 provides the gate bias for the common gate amplifier 415. A microbolometer 425 (e.g., thermally-shorted microbolometer) is used as the substrate temperature compensated load for the circuit 400. A bias generator 440 may generate a bias voltage $V_{load}$ (e.g., also referred to as a load voltage or simply as a load). The bias voltage $V_{load}$ is adjustable to set an operating point for the circuit 400 by setting an output voltage $V_{out}$ at a desired point within a range of output voltages. An amplifier 430 is used to amplify the signal level at a node connecting the microbolometer 425 (e.g., a load resistor) and the drain of the common gate amplifier 415. In an embodiment, the microbolometer 405 may be a detector of the unit cell array 205. In an embodiment, the bias generator 410, 420, and/or 440 may be, may include, or may be a part of the control bias and timing circuitry 235. The bias generator 410, 420, and/or 440 may be, may include, or may be a part of, one or more logic devices.

Incident radiation 435 heats the microbolometer 405, which changes the resistance of the microbolometer 405. During a bias integration period, the current through the microbolometer 405 may be determined by the voltage across and resistance of the microbolometer 405. The voltage across the microbolometer 405 is equal to the difference between the voltage of the bias generator 410 and the source potential of the common gate amplifier 415. Higher levels of the incident radiation 435 cause the temperature of the microbolometer 405 to rise and the resistance of the microbolometer 405 to rise or fall depending upon its temperature coefficient of resistance (TCR), and therefore a smaller or larger current flows into the source of the common gate amplifier 415. Since the source and drain currents of the common gate amplifier 415 are approximately equal, the same current flows through the microbolometer 425. The voltage across the microbolometer 425 is amplified by the amplifier 430. Thus, increased levels of the incident radiation 435 result in a lower or higher current through and voltage across the microbolometer 425, and this voltage change is amplified by the amplifier 430 to generate the output voltage $V_{out}$. In some cases, the bias voltage $V_{load}$ is used to change the voltage across the microbolometer 425 and thereby adjust the potential at the input of the amplifier 430. In this manner, the operation point of the amplifier 430 is adjusted.

Figure 5A:
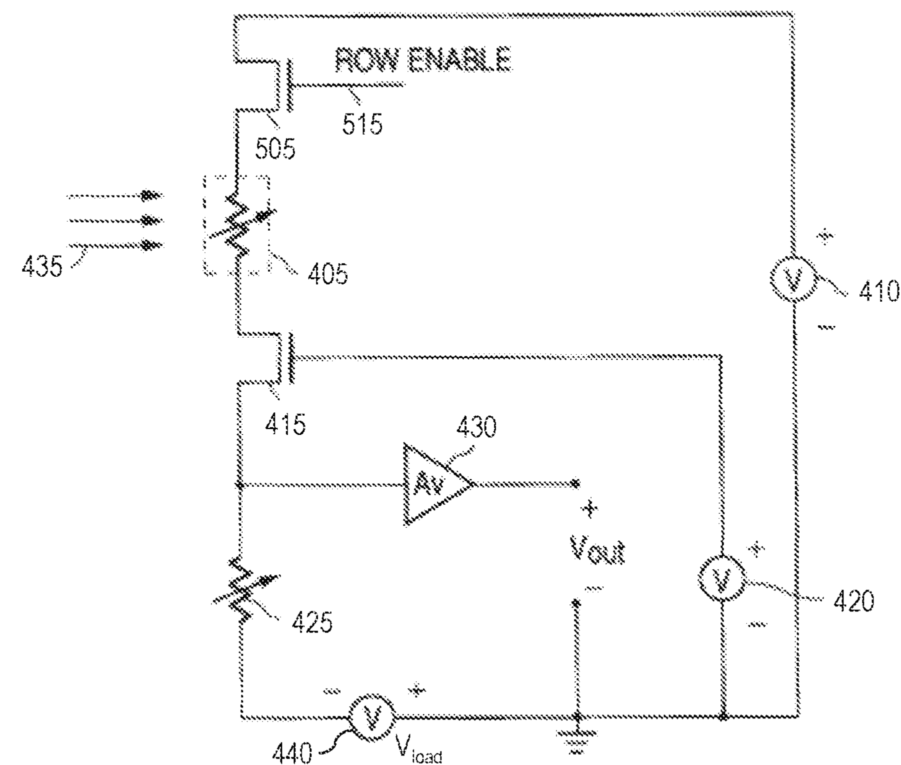
FIG. 5A shows placement of a select transistor on a supply side of a microbolometer of the circuit of FIG. 4.
Figure 5B:
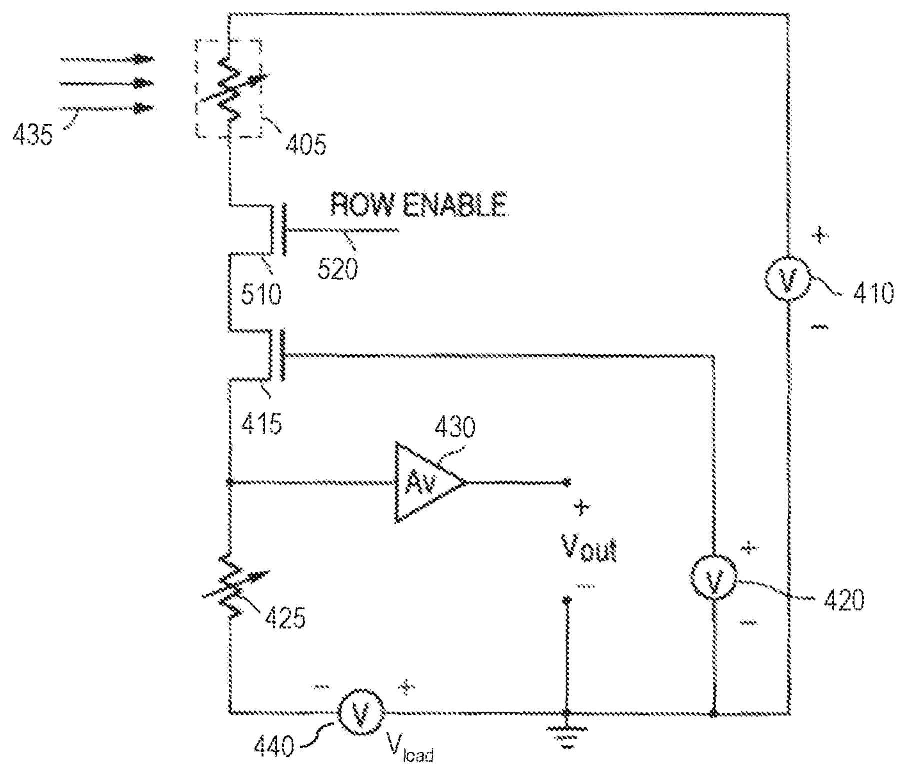
FIG. 5B shows placement of a select transistor on a common gate amplifier side of the microbolometer of the circuit of FIG. 4.

To implement the circuit 400 in an array configuration, a part of the circuit 400 is placed in a unit cell (e.g., of the unit cell array 205) and a part of the circuit 400 is in a column amplifier (e.g., the column amplifier 220 and/or 225). In addition, a select transistor may be used to support row addressing for multiplexing. FIG. 5A shows placement of a select transistor 505 on the supply side of the microbolometer 405. A row enable signal 515 is applied to the select transistor 505. FIG. 5B shows placement of a select transistor 510 on the common gate amplifier side of the microbolometer 405. A row enable signal 520 is applied to the select transistor 510. In one case, the select transistor 505 or 510 and the microbolometer 405 may be placed in a unit cell, and the common gate amplifier 415, the microbolometer 425, and the amplifier 430 may be placed in the column amplifier 220.

In an embodiment, the microbolometer 425 is a thermally-shorted microbolometer. A thermally-shorted microbolometer is thermally shorted to a substrate material. In general, a temperature of a thermally-shorted microbolometer is dominated by a high thermal conductivity of a substrate. Incident radiation and electrical power dissipated in the thermally-shorted microbolometer may have little effect on a temperature of the thermally-shorted microbolometer. The thermally-shorted microbolometer may have a high temperature coefficient of resistance, similar to a thermally-isolated microbolometer, and thus the thermally-shorted microbolometer may provide a high sensitivity reference to the substrate temperature.

In an embodiment, the microbolometer 405 is a thermally-isolated microbolometer. A thermally-isolated microbolometer is thermally isolated from its supporting substrate or surroundings to facilitate generation of a temperature change in the microbolometer material in response to an absorbed incident radiation (e.g., incident IR radiation). The thermal isolation may be designated by a dashed box, as shown with reference to the microbolometer 405. The thermally-isolated microbolometer may change temperature in response to an incident radiation level, changes in the substrate temperature, and electrical power dissipated in the microbolometer during measurement of the microbolometer's resistance. Heating due to resistive measurement may be referred to as self-heating. While the temperature of the thermally-isolated microbolometer does track the substrate temperature to some extent (e.g., the thermally isolated microbolometer is generally not perfectly insulated from the substrate), the rate of temperature change due to tracking the substrate temperature is generally much slower than the rate of temperature change due to the incident radiation or self-heating.

Figure 6:
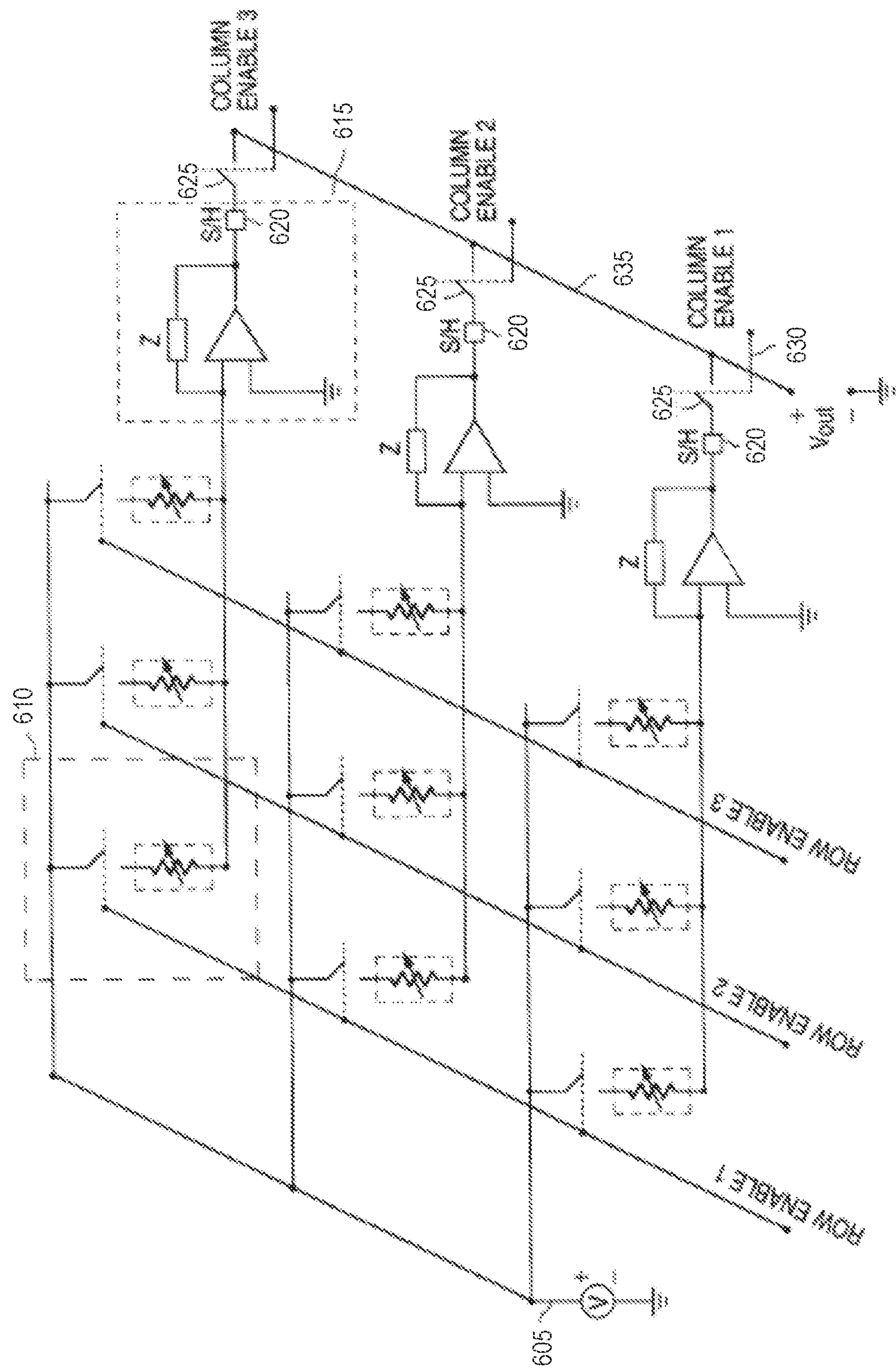
FIG. 6 illustrates a two-dimensional three-by-three configuration of microbolometers.

FIG. 6 illustrates a two-dimensional three-by-three configuration of microbolometers. A voltage supply 605 is used to provide a bias voltage to each of the microbolometers, where each microbolometer is part of a unit cell 610. Each column of the microbolometers is coupled to a column amplifier 615 and a corresponding sample and hold stage 620. A column multiplexing switch 625 selectively couples (e.g., using a column enable signal 630) the sample and hold stage 620 to an output line 635 (e.g., to sample a column of the microbolometers). In an embodiment, the voltage supply 605 may be, may include, or may be a part of, the bias generator 410, the unit cell 610 may be, may include, or may be a part of, a unit cell of the unit cell array 205, and/or the column amplifier 615 may be, may include, or may be a part of, the column amplifier 220 and/or 230.

In some embodiments, a burn-in effect on an imaging device is mitigated. In an aspect, when a detector array (e.g., microbolometer array) of an imaging device (e.g., the imaging system 100) images the Sun and/or other high-irradiance source, a burn-in effect may take place in which an exposed portion of the array (e.g., exposed pixels of the detector array) have an offset due to imaging the Sun and/or other high-irradiance source. In an aspect, the offset corresponds to, and may be referred to as, a burn-in or a sunburn. For example, a portion of the detector array of the imaging device may be exposed to the Sun and/or other high irradiance source. The portion of the detector array may have an offset due to the portion's exposure to the Sun and/or other high irradiance source. Image pixels captured by the portion of the detector array may appear as a bright spot(s) and/or a streak(s) (e.g., such as if the detector array is moved while imaging the high irradiance source), thus adversely affecting image quality.

It is noted that the detector array need not be active in capturing (e.g., turned on to capture) an image to exhibit a burn-in effect. The portion of the detector array that exhibits a burn-in effect may have been exposed to the Sun and/or other high irradiance source when the imaging device was off. As one such case, in a vehicular application (e.g., unmanned vehicle application, automotive application), a shutterless imaging device (e.g., shutterless thermal imaging device) may be mounted on, integrated into, or otherwise coupled to a vehicle. For instance, the vehicle may be parked and the vehicle and its imaging device powered off, but with a field of view of the imaging device encompassing the Sun. Even though the imaging device is powered off in this example, exposure of at least a portion of the imaging device to the Sun for a period of time may cause a streak in image pixels captured by the portion of the imaging device, since the Sun moves within the field of view of the imaging device as time passes.

In an aspect, a decay rate of the offset may be a function of both the irradiance level of the high irradiance source and the exposure time of the detector array (or portion thereof) to the high irradiance source. In some cases, the decay rate of the offset may be very slow and thus adversely affect image quality of images output by the imaging device for an extended period of time. As one example, the imaging device may be a shutterless camera. For the shutterless camera, a burn-in may be present and full decay of the burn-in (e.g., of the offset) may take hours or even days (e.g., dependent on an intensity/irradiance and a duration of time that the camera was exposed to the Sun and/or irradiance source). The decay rate may be adjusted by adjusting a temperature of the detector(s). In an aspect, the decay rate may be increased (e.g., faster decay) by heating the detector(s) to a higher temperature. As such, the heating of the detector(s) after a sunburn event may cause the burn-in spot(s) to disappear more rapidly. In some cases, an FPA (e.g., including the detector(s) and the ROIC) is heated to mitigate the burn-in spot(s). In some cases, the burn-in effect may be associated with a compositional, molecular, and/or other material change (e.g., related to electron and hole mobility), with the heating of the detector(s) used to mitigate (e.g., revert) the compositional, molecular, and/or other material change.

In some embodiments, as a correction procedure for the burn-in effect, the imaging device may be heated to a higher temperature to cause a burn-in spot(s) to decay more rapidly relative to a case in which such heating is not applied. In an aspect, as opposed to an imaging mode, the imaging device (e.g., the detector array) may be referred to as operating in a correction mode or burn-in mitigation mode when the correction procedure is being performed. The correction procedure may be performed in response to a user command (e.g., pressing a button on the imaging device, sending an instruction to the imaging device via the user's mobile device, setting to periodically perform the correction procedure, etc.) and/or automatically in response to a determination that a burn-in effect may be present (e.g., based at least in part on pixel values). Such a correction procedure may be performed for applications (e.g., outdoor applications or indoor applications) in which the microbolometer sensor(s) (e.g., of an uncooled microbolometer FPA) may be exposed to direct sunlight and/or other high-irradiance sources though a lens. The correction procedure may be performed during a non-imaging mode of operation, such as when the camera is in a standby mode. In some aspects, the heating is applied to heat at least the detector array and the ROIC (e.g., substrate) of the imaging device.

In a non-limiting embodiment, the imaging device (e.g., detector array) may be heated to an elevated temperature and held at the elevated temperature for a length of time. In one aspect, the detector array may be heated by adjusting (e.g., increasing) a bias level (e.g., a voltage bias level) applied to the detector array, relative to a bias level applied during the imaging mode of operation. The length of time may be based on characterization studies associated with the imaging devices (e.g., performed during design, simulation, and/or testing of the imaging devices and/or portions thereof). The characterization studies may involve formulation and refinement of models, equations, and/or other manners that characterize the imaging devices and/or portions thereof. For instance, for a given elevated temperature, the characterization studies may provide a relationship between an amount of time the detector is to be maintained at the elevated temperature and a magnitude associated with the burn-in spot. In some cases, such characterization studies may be performed for different elevated temperatures. An example range of the elevated temperature of an imaging device (e.g., a detector array) may be between around 90° C. and around 110° C., although such a range is generally based on applications/environments in which the imaging device are to be utilized. An example amount of time to maintain the imaging device at the elevated temperature may be in the tens of seconds. In one aspect, the length of time may be a length of time determined to be sufficient for a magnitude associated with the burn-in spot. In one aspect, the length of time may be a predetermined length of time. As one example, the predetermined length of time may be a length of time determined to be sufficient to eliminate a worst-case burn-in blemish (e.g., spot/streak), which may be characterized by an intensity/irradiance and/or an exposure time of an irradiance source on the detector array) accounted for in a design of the imaging device or portion thereof (e.g., detector array, ROIC).

After an amount of time at the elevated temperature and/or after the burn-in spot(s) is determined to have decayed sufficiently, the imaging device may be transitioned to a lower temperature, such as an ambient temperature or a temperature (e.g., operating temperature) that the imaging device was at prior to heating the imaging device. An example range of the operating temperature may be around 40° ° C. to around 80° C. As non-limiting examples, the burn-in spot(s) may be determined to have decayed sufficiently based on user inspection of captured images (e.g., no burn-in spot and/or streak is visible), and/or when a contribution to a pixel value attributable to the burn-in effect is below a threshold. The transition of the imaging device to the lower temperature may be referred to as a cool-down event.

Once at the lower temperature (e.g., a temperature within the imaging device's calibrated/operational range), the imaging device may resume with the imaging mode of operation or may be evaluated to determine whether the burn-in spot(s) has decayed sufficiently. If the burn-in spot(s) is determined not to have decayed sufficiently, another correction procedure (e.g., heating to and maintaining of the elevated temperature) may be performed again and the burn-in spot(s) evaluated. In some cases, a temperature sensing diode may be used to track the temperature of the imaging device. The temperature sensing diode may be a part of the imaging device or may be a separate device that can be coupled to the imaging device.

In one aspect, when heating of the imaging device is effectuated through increasing a bias level applied to the detector array, the imaging device (e.g., the detector array) may be cooled by reducing the applied bias or disabling the bias (e.g., setting the bias voltage to zero). In some cases, heatsinking can be leveraged to reduce the temperature of the detector array (e.g., once the bias level is reduced). In some aspects, a thermoelectric cooler (TEC) may be included as part of or otherwise coupled to the imaging device to help heat and/or cool the imaging device or a portion thereof (e.g., detector array, ROIC) to a desired temperature.

Figure 7:
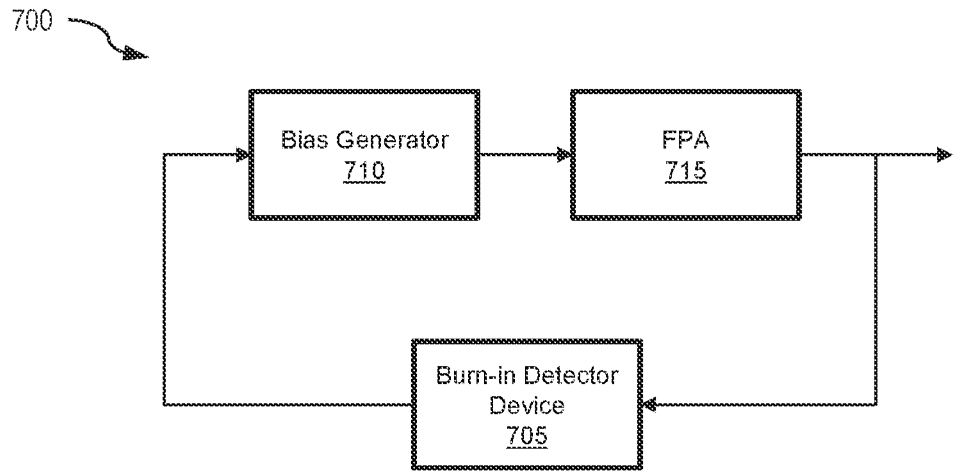
FIG. 7 illustrates an example system for facilitating burn-in mitigation in accordance with one or more embodiments of the present disclosure.

FIG. 7 illustrates an example system 700 for facilitating burn-in mitigation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 700 includes a burn-in detector device 705, a bias generator 710, and an FPA 715. The FPA 715 includes a detector array and an ROIC. In an embodiment, the burn-in detector device 705 and the bias generator 710 may be implemented using one or more processing circuits on a single chip or distributed across two or more chips.

The burn-in detector device 705 may detect burn-in associated with the FPA 715. In an embodiment, the burn-in detector device 705 may be implemented by the sensing component 135. In some cases, the burn-in detector device 705 may detect burn-in based on knowledge that the Sun and/or other high irradiance source has been encompassed by a field of view of the FPA 715. Such knowledge may be provided by a user, by image processing (e.g., shape and/or size determination of the irradiance source and/or automatic detection of bright spots or streaks), and/or irradiance associated with an object in the field of view of the FPA 715. In some cases, the burn-in detector device 705 may be a combination of these and possibly other methods. In some cases, the burn-in detector device 705 may determine that a burn-in is present in the FPA 715 when a set of pixels of the detector array are saturated whereas pixels neighboring those of the set of pixels are not saturated. In some cases, a determination of whether a burn-in is present may be based on digital count values output from the pixels. The burn-in detector device 705 may determine that the burn-in spot(s) is no longer present when a contribution to a pixel value attributable to the burn-in effect is below a threshold.

In some cases, user inspection may be performed in addition to or instead of a determination by the burn-in detector device 705. A user may see visible burn-in spot(s) on images captured by the FPA 715 and/or may know that the Sun and/or other high-irradiance source is and/or has been encompassed by the field of view of the FPA 715. A determination that the burn-in spot(s) is no longer present (e.g., after burn-in spot(s) mitigation has been performed) may be based on user inspection of captured images (e.g., no burn-in spot and/or streak is visible in the images). In some cases, the burn-in detector device 705 may be aided by user inspection. For example, the burn-in detector device 705 may identify (e.g., via object recognition) a potential burn-in spot(s) and provide the potential burn-in spot(s) to the user for confirmation, such as by displaying an image to the user (e.g., with annotations of the potential burn-in spot(s)) and/or displaying a textual and/or pictorial indication of the potential burn-in spot(s), and request that the user classify/confirm the potential burn-in spot(s) as being a burn-in spot or not a burn-in spot. The images captured by the FPA 715 may be provided for display (e.g., to a user), storage, and/or further processing. In an embodiment, the FPA 715 may be, may include, or may be a part of, the imaging capture component 115.

It is noted that FIG. 7 provides an example embodiment for facilitating burn-in mitigation. In some embodiments, there may be no burn-in detector and instead the bias generator 710 performs the mitigation method on a regular schedule, such as each time an imaging device that includes the system 700 is powered on, and/or in response to a user command. In some cases, the user may provide an instruction to the imaging device to perform burn-in mitigation when the user believes the Sun and/or other high irradiance source is or has been in a field of view of the imaging device. In one example, for an imaging device integrated into or otherwise coupled to a vehicle, a user (e.g., a driver) of the vehicle may become aware of the Sun having entered the imaging device's field of view during the drive or before starting the drive and instruct the imaging device to perform burn-in mitigation (e.g., since the Sun may possibly have caused a burn-in spot(s) and/or streak(s)).

The bias generator 710 applies a bias scheme according to whether a burn-in has been detected (e.g., by the burn-in detector device 705 and/or user inspection). In an embodiment, the bias generator 710 may be, may include, or may be a part of, the control bias and timing circuitry 235. In an embodiment, the FPA 715 may be, may include, or may be a part of the imaging capture component 115. A bias scheme may be characterized by a bias signal level (e.g., a bias voltage level, a bias current level) applied to the FPA 715, a time to apply the bias signal to the FPA 715, a load voltage level, and so forth. The bias generator 710 may apply a first bias scheme when no burn-in is detected (e.g., no burn-in is determined to be present). For example, the first bias scheme may be associated with a bias voltage $V_1$. Applying the first bias scheme corresponds to normal operation (e.g., imaging operation) of the FPA 715.

The bias generator 710 may apply a second bias scheme when a burn-in is detected. Applying of the second bias scheme on the FPA 715 may raise a temperature of the FPA 715. The second bias scheme may be referred to as an overbias scheme. The second bias scheme may be based on application. For example, the second bias scheme may be defined to cause decay of a burn-in spot at a desired rate and/or to allow the FPA 715 to return to normal operation within a desired amount of time of applying the second bias scheme, while being safe to a user(s), the FPA 715, and other components coupled to the FPA 715 and avoiding or minimizing effect on a lifetime (e.g., a vacuum life) of the FPA 715 due to mitigating the burn-in.

In some aspects, the overbias scheme for mitigating the burn-in spot(s) may be implemented as a bias voltage and/or a bias current applied to the detector array of the FPA 715 that is higher than a bias voltage and/or a bias current applied to the detector array in a case that burn-in spot mitigation is not being performed. Alternatively or in addition, for a set bias time, the overbias scheme for mitigating the burn-in spot(s) may include slowing (e.g., relative to normal operation of the FPA 715) an ROIC clock to effectively increase the bias time. Alternatively or in addition, the overbias scheme include increasing (e.g., relative to normal operation) a load voltage $V_{load}$ to increase the bias heating. In some embodiments, the overbias scheme may be implemented via a control loop in which an overbias method (e.g., increased current, increased integration time, etc.) is actively adjusted to maintain a specified sensor temperature for a specified period of time.

After the correction procedure is completed (e.g., the burn-in spot(s) has sufficiently decayed), the overbias may be removed. As an example, when the ROIC clock is slowed to mitigate the burn-in spot(s), the ROIC clock may be increased to its normal rate (e.g., the rate utilized during normal operation of the FPA 715) after the burn-in spot(s) has sufficiently decayed. As an example, when the load voltage $V_{load}$ is increased to mitigate the burn-in spot(s), the load voltage $V_{load}$ may be decreased to its normal voltage level (e.g., the voltage level utilized during normal operation of the FPA 715). The overbias scheme may be applied for an appropriate amount of time to mitigate the burn-in spot(s). After the overbias scheme is applied for the appropriate amount of time, an amount of additional time may be allotted to allow the FPA 715 to reduce in temperature. After at least the additional time has passed, the FPA 715 may transition to the normal operation mode and capture an image with the first bias scheme applied. The burn-in detector device 705 and/or user may determine, based on the image, whether a burn-in is present. If burn-in is present, the FPA 715 transitions out of the normal operation mode and the second bias scheme may be applied to the FPA 715. If burn-in is no longer present, the FPA 715 may continue to operate in the normal operation mode. As one example, the overbias scheme may be applied for around one minute in some cases. Another minute may be allotted to allow the FPA 715 to reduce in temperature prior to determining whether the burn-in is present and whether to transition the FPA 715 back to the normal operation mode. In some cases, applying the overbias scheme for too long a period of time may cause damage (e.g., irreversible damage) to one or more components of the FPA 715 (and/or other components of an imaging device that includes the FPA 715).

Figure 8:
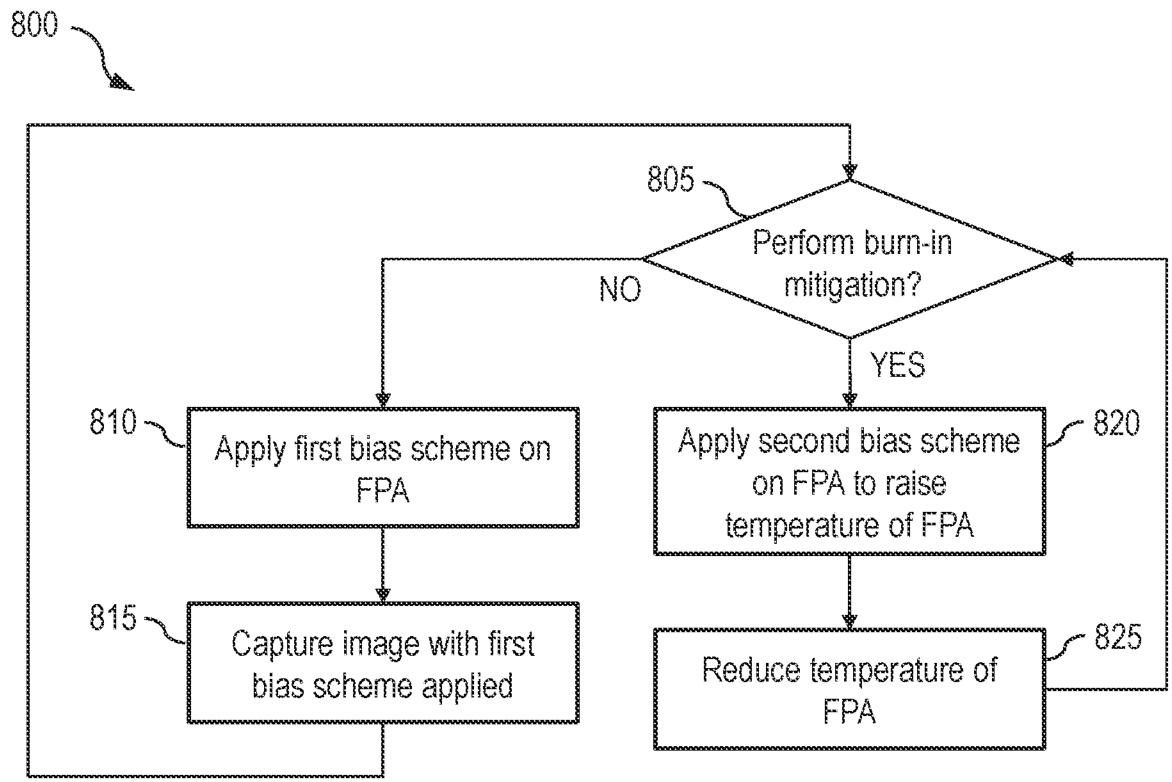
FIG. 8 illustrates a flow diagram of an example process for facilitating burn-in mitigation in accordance with one or more embodiments of the present disclosure.

FIG. 8 illustrates a flow diagram of an example process 800 for facilitating burn-in mitigation in accordance with one or more embodiments of the present disclosure in accordance with one or more embodiments of the present disclosure. For explanatory purposes, the process 800 is primarily described herein with reference to the system 700 of FIG. 7. However, the process 800 can be performed in relation to other systems for facilitating burn-in mitigation. Note that one or more operations in FIG. 8 may be combined, omitted, and/or performed in a different order as desired.

At block 805, a determination is made as to whether to perform burn-in mitigation. In some aspects, such a determination may be a determination as to whether burn-in is present in the FPA 715. In such aspects, the determination may be made by the burn-in detector device 705 and/or user inspection. In some aspects, such a determination may be made without a burn-in detector device. For example, there may be no burn-in detector and instead burn-in mitigation may be performed on a regular schedule, such as each time an imaging device that includes the system 700 is powered on and/or afterwards (e.g., at set or random intervals), and/or in response to a user command. If the determination is to not perform burn-in mitigation, the process 800 proceeds to block 810. At block 810, the bias generator 710 applies a first bias scheme on the FPA 715. At block 815, the FPA 715 captures an image with the first bias scheme applied. The process 800 proceeds from block 815 to block 805 to determine whether perform burn-in mitigation (e.g., prior to capturing a next image with the first bias scheme applied).

If the determination at block 805 is to perform burn-in mitigation, the process 800 proceeds to block 820. At block 820, the bias generator 715 applies a second bias scheme on the FPA 715 to raise a temperature of (e.g., heat) the FPA 715. The second bias scheme may be applied for an amount of time (e.g., a predetermined amount of time). At block 825, a temperature of the FPA 715 is reduced. To reduce the temperature of the FPA 715, the bias generator 715 may be turned off (e.g., to apply no bias to the FPA 715), may apply the first bias scheme, and/or may apply one or more intermediate bias schemes as part of transitioning from the second bias scheme back to the first bias scheme. The process 800 proceeds from block 825 to block 805, in which a determination is made as to whether to perform burn-in mitigation.

In some aspects, an imaging device may be heated by applying a bias signal to detectors (e.g., microbolometer sensors) of the detector array. The bias signal may be applied by the control bias and timing circuitry 235 to one or more unit cells of the unit cell array 205. The bias signal applied to mitigate the burn-in spot(s) may be referred to as an overbias signal (e.g., to cause overbiasing relative to a case in which burn-in spot mitigation is not performed). In one case, the overbiasing of the detector array may cause the entire detector array (e.g., all the detectors of the detector array) to self-heat by around 80° C. relative to a temperature at which the sunburn effect occurred. For example, the temperature may rise from a temperature of around 20° C. to a temperature of around 100° C. In one case, such self-heating may occur within one or two minutes. As an example, with reference to FIG. 7, the overbiasing may cause the FPA 715, including its entire detector array and substrate material, to self-heat. In some cases, the overbiasing may drive a current into the ROIC, and an associated power dissipation may rapidly heat up the ROIC. In some cases, a bias voltage $V_1$ may be applied to the detector array during normal operation of the thermal imaging device and a bias voltage $V_2$ may be applied to the detector array to cause heating of the FPA 715 (e.g., the detector array and ROIC). For instance, the bias voltage $V_1$ may be around 6 V and the bias voltage $V_2$ may be around 11 V.

In some aspects, after the FPA 715 has been at the higher temperature for an amount of time (e.g., a predetermined amount of time in some cases), the bias voltage $V_1$ or other voltage lower than the bias voltage $V_2$ may be applied to transition the imaging device (e.g., the detector array) to a lower temperature. In some cases, the bias may be disabled (e.g., a bias voltage of zero volts) to transition the imaging device to the lower temperature. Once at the lower temperature, a determination may be made as to whether the burn-in spot(s) has decayed sufficiently. If the burn-in spot(s) is determined to have decayed sufficiently, the bias voltage $V_1$ may be applied to facilitate normal operation of the detector array. If the burn-in spot(s) is determined not to have decayed sufficiently, an overbiasing-event to heat the imaging device followed by a cooling-event to cool the imaging device may be performed again. In other aspects, the bias voltage $V_1$ or other voltage lower than the bias voltage $V_2$ may be applied to allow the imaging device to transition to the lower temperature after the burn-in spot(s) is determined to have decayed sufficiently.

Figure 9:
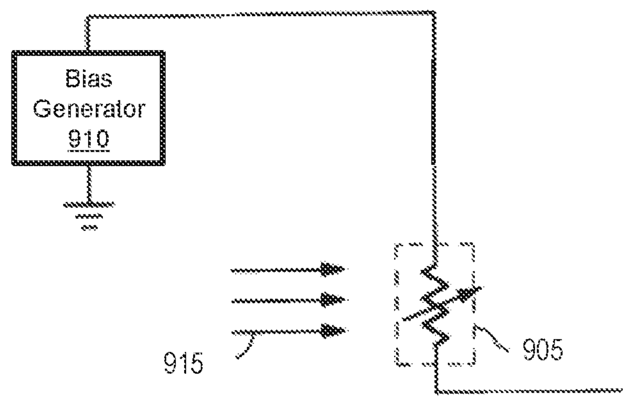
FIGS. 9 and 10 illustrate examples of circuits for applying a variable bias signal in accordance with one or more embodiments.

FIG. 9 illustrates an example circuit for applying a variable bias signal in accordance with one or more embodiments. The circuit includes a microbolometer 905 and a bias generator 910 that generates and provides a bias signal to the microbolometer 905 to bias the microbolometer 905. The microbolometer 905 receives incident radiation 915. The bias generator 910 may generate a bias signal (e.g., bias voltage, bias current) based on whether to perform burn-in mitigation (e.g., based on whether a burn-in effect is detected) for a detector array that includes the microbolometer 905. For example, the bias generator 910 may generate a bias voltage $V_1$ (e.g., 6 V) when burn-in effect mitigation is not being performed for the detector array and a bias voltage $V_2$ (e.g., 10 V) when burn-in effect mitigation is being performed for the detector array. In an aspect, a burn-in effect may be detected to be present for the detector array even if no burn-in effect is detected for the microbolometer 905 (e.g., when other microbolometers of the detector array exhibit a burn-in spot(s)). In an aspect, biasing of the microbolometer 905 using the bias voltage $V_2$ causes heating of the microbolometer 905 to hasten decay of a burn-in spot. It is noted that the bias generator 910 may provide the bias signal to the microbolometer 905 as well as other microbolometers of the detector array. In some cases, a bias signal generated by the bias generator 910 may be tunable (e.g., tunable based on application). For example, a control signal may be provided as a number of bits to a DAC that converts the bits into an analog signal (e.g., voltage, current) of a certain level used to bias the microbolometers. In an embodiment, the microbolometer 905 may be a detector of the unit cell array 205. In an embodiment, the bias generator 910 may be, may include, or may be a part of the control bias and timing circuitry 235.

Figure 10:
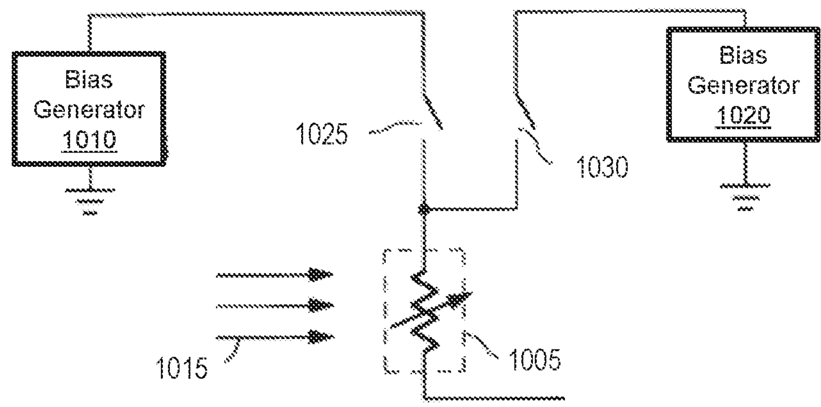

FIG. 10 illustrates another example circuit for applying a variable bias signal in accordance with one or more embodiments. The circuit includes a microbolometer 1005, a bias generator 1010, a bias generator 1020, a switch 1025, and a switch 1030. In an embodiment, the microbolometer 1005 may be a detector of the unit cell array 205. In an embodiment, the bias generator 1010, the bias generator 1020, the switch 1025, and the switch 1030 may collectively be, may collectively include, or may collectively be a part of, the control bias and timing circuitry 235. It is noted that the bias generators 1010 and 1020 may provide a bias signal to the microbolometer 1005 as well as other microbolometers of the detector array.

The bias generator 1010 may generate a bias signal (e.g., bias voltage, bias current), also referred to as an overbias signal, for mitigating burn-in effect. In this regard, the bias generator 1010 may provide (e.g., generate and transmit) the bias signal when burn-in effect mitigation is being or to be performed for the detector array (e.g., such as when a burn-in effect is detected for the detector array). When burn-in effect mitigation is being or to be performed, the switch 1020 may be open and the switch 1025 may be closed to couple the bias signal to the microbolometer 1005 (and other microbolometers) to bias the microbolometer 1005 (and other microbolometers). When burn-in effect mitigation is not being or is not to be performed, the switch 1025 may be open and the switch 1020 may be closed. The bias generator 1010 may enter a standby mode (e.g., a low power mode) when burn-in effect mitigation is not being performed (e.g., to conserve power).

The bias generator 1020 may generate a bias signal (e.g., bias voltage, bias current) during normal operation of the microbolometer 1005 (e.g., when no burn-in effect is detected). When burn-in effect mitigation is not being or is not to be performed, the switch 1030 may be closed to couple the bias signal from the bias generator 1020 to the microbolometer 1005 (and other microbolometers) to bias the microbolometer 1005 (and other microbolometers). For example, the bias generator 1020 may generate a bias voltage $V_1$ (e.g., 6 V) when burn-in effect mitigation is not being or is not to be performed for the detector array, and the bias generator 1010 may generate a bias voltage $V_2$ (e.g., 10 V) when burn-in effect mitigation is being or is to be performed for the detector array. In an aspect, biasing of the microbolometer 1005 using the bias voltage $V_2$ causes heating of the microbolometer 1005 to hasten decay of a burn-in spot. In some cases, a bias signal generated by the bias generator 1010 and/or 1020 may be tunable (e.g., tunable based on application). When burn-in effect mitigation is being or is to be performed, the switch 1030 may be opened. The bias generator 1010 may enter a standby mode (e.g., a low power mode) when a burn-in effect is detected (e.g., to conserve power).

Alternatively or in addition to adjusting the bias signal to effectuate a temperature change as shown in FIGS. 9 and 10, other parameters may be adjusted to cause heating of an FPA. As examples, an ROIC clock may be slowed (e.g., using appropriate clock signals from the control bias and timing circuitry 235) and/or a load voltage $V_{load}$ may be increased to cause heating of an FPA and thus hasten decay of the burn-in spot(s). For instance, clock signals may be used as appropriate to control the switches 1025 and 1030 to set an amount of time the microbolometer 1005 is biased by the bias generator 1010 or the bias generator 1020. Alternatively or in addition, a TEC and/or other external devices to heat and/or cool (e.g., rapidly heat and/or rapidly cool) may be employed.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:

applying a first bias signal to a sensor array of an imaging device to increase a temperature of the sensor array to facilitate burn-in mitigation;

during the applying, setting a clock rate associated with the sensor array and a readout circuit coupled to the sensor array to a first rate;

after the applying, setting the clock rate to a second rate different from the first rate;

reducing the temperature of the sensor array; and after the reducing the temperature, determining whether a burn-in is present in the sensor array.

2. The method of claim 1, further comprising receiving user input associated with the burn-in mitigation, wherein the applying is performed in response to the user input.

3. The method of claim 1, wherein the applying is performed in response to a power on of the imaging device.

4. The method of claim 1, further comprising determining whether the burn-in is present in at least a portion of the sensor array, wherein the applying is performed to remove the burn-in, and wherein the determining whether the burn-in is present comprises determining whether the burn-in has been removed.

5. The method of claim 4, further comprising:

in response to determining the burn-in has been removed, applying a second bias signal different from the first bias signal; and capturing, by the sensor array with the second bias signal applied, an image.

6. The method of claim 5, wherein the first bias signal is associated with a first bias level, and wherein the second bias signal is associated with a second bias level lower than the first bias level.

7. The method of claim 4, further comprising:

in response to determining that the burn-in is present, applying a first load voltage to the sensor array to increase the temperature of the sensor array; and in response to determining that the burn-in has been removed, applying a second load voltage to the sensor array, wherein the second load voltage is different from the first load voltage.

8. The method of claim 4, further comprising, in response to determining the burn-in has not been removed, repeating the applying, the reducing, and the determining whether the burn-in has been removed.

9. The method of claim 1, further comprising capturing, by the sensor array, radiation associated with a high-irradiance source, wherein the burn-in is associated with the radiation, wherein the high-irradiance source comprises the Sun, wherein the sensor array is off during the capturing, and wherein the sensor array comprises a plurality of microbolometers.

10. An imaging device comprising:

a sensor array configured to capture images of a scene; and a processing circuit configured to:

apply a first bias signal to the sensor array to increase a temperature of the sensor array to a first temperature for burn-in mitigation;

reduce the temperature of the sensor array;

after reducing the temperature, determine whether a burn-in is present in the sensor array; and apply a second bias signal different from the first bias signal in response to determining that the burn-in is not present; and the sensor array is configured to capture, with the second bias signal applied, an image.

11. The imaging device of claim 10, wherein the processing circuit is further configured to receive user input associated with the burn-in mitigation, and wherein the processing circuit is configured to apply the first bias signal in response to the user input.

12. The imaging device of claim 10, wherein the processing circuit is further configured to determine, prior to applying the first bias signal, that the burn-in is present in at least a portion of the sensor array, and wherein the processing circuit is configured to apply the first bias signal based on determining that the burn-in is present.

13. An imaging device comprising:

a sensor array configured to capture images of a scene; and a processing circuit configured to:

apply a first bias signal to the sensor array to increase a temperature of the sensor array to a first temperature for burn-in mitigation;

reduce the temperature of the sensor array;

after reducing the temperature, determine whether a burn-in is present in the sensor array;

apply a first load voltage to the sensor array in response to a determination that the burn-in is present; and apply a second load voltage to the sensor array in response to a determination that the burn-in is not present, wherein the second load voltage is different from the first load voltage.

14. The imaging device of claim 10, wherein, in response to a determination that the burn-in is present:

the processing circuit is configured to apply the first bias signal to the sensor array to increase the temperature of the sensor array to the first temperature;

the sensor array is configured to reduce from the first temperature to a second temperature; and the processing circuit is configured to determine whether the burn-in has been removed.

15. The imaging device of claim 10, further comprising a clock generator configured to:

during applying of the first bias signal, set a clock rate associated with the sensor array to a first rate; and after the applying, setting the clock rate associated with the sensor array to a second rate higher than the first rate.

16. The imaging device of claim 15, wherein the clock rate is associated with a readout circuit coupled to the sensor array.

17. The imaging device of claim 10, wherein the sensor array is configured to capture radiation associated with a high-irradiance source when the sensor array is off, and wherein the burn-in is associated with the radiation.

18. The imaging device of claim 10, further comprising a microbolometer focal plane array comprising the sensor array and a readout circuit, and wherein the microbolometer focal plane array comprises an uncooled microbolometer focal plane array.

19. The imaging device of claim 13, further comprising a clock generator configured to:

set a clock rate associated with the sensor array to a first rate in response to a determination that the burn-in is present; and set the clock rate associated with the sensor array to a second rate higher than the first rate in response to a determination that the burn-in is not present.

20. The imaging device of claim 13, wherein the processing circuit is further configured to apply a second bias signal having a voltage level lower than a voltage level of the first bias signal in response to a determination that the burn-in is not present.

* * * * *